United States Patent [19]

Berc et al.

[11] Patent Number: 5,796,939
[45] Date of Patent: Aug. 18, 1998

[54] HIGH FREQUENCY SAMPLING OF PROCESSOR PERFORMANCE COUNTERS

[75] Inventors: Lance M. Berc, Menlo Park; Sanjay Ghemawat, Mountain View; Monika H. Henzinger; Richard L. Sites, both of Menlo Park; Carl A Waldspurger, Atherton; William E. Weihl, San Francisco, all of Calif.

[73] Assignee: Digital Equipment Corporation, Maynard, Mass.

[21] Appl. No.: 812,899

[22] Filed: Mar. 10, 1997

[51] Int. Cl.[6] .................................................. G06F 11/00
[52] U.S. Cl. ........................ 395/184.01; 395/183.21; 711/216
[58] Field of Search ................ 395/184.01, 183.06, 395/183.07, 183.08, 183.15, 183.13, 183.21, 185.04, 733, 742, 734; 711/216, 221, 129, 135

[56] References Cited

U.S. PATENT DOCUMENTS

| 5,151,981 | 9/1992 | Westcott et al. | 395/185.01 |
|---|---|---|---|
| 5,193,179 | 3/1993 | Laprade et al. | 395/184.01 |
| 5,537,541 | 7/1996 | Wibecan | 395/184.01 |
| 5,557,548 | 9/1996 | Gover et al. | 364/551.01 |
| 5,564,015 | 10/1996 | Bunnell | 395/184.01 |
| 5,642,478 | 6/1997 | Chen et al. | 395/183.21 |
| 5,651,112 | 7/1997 | Matsuno et al. | 395/184.01 |
| 5,675,729 | 10/1997 | Mehring | 395/183.13 |
| 5,748,855 | 5/1998 | Levine et al. | 395/185.01 |

OTHER PUBLICATIONS

"Guide to IPROBE, Installing and Using," CSG Performance Group, Tools Group, Nov. 1994, Digital Equipment Corp.
"Performance Analysis Using the MIPS R10000 Performance Counters," Zagha et al., Silicon Graphics Inc., Mountain View, Calif. |marcoz,brond,swt,martyi| @sgi.com.
"The Program Structure Tree: Computing Control Regions in Linear Time," Johnson et al., Dept. of Computer Science, Cornell Univ., SIGPLAN 94–6/94 Orlando, Florida, copyright 1994 ACM 0-89791-662-x/940006.

*Primary Examiner*—Joseph Palys
*Attorney, Agent, or Firm*—Dirk Brinkman

[57] ABSTRACT

In a computer system, an apparatus is configured to collect performance data of a computer system including a plurality of processors for concurrently executing instructions of a program. A plurality of performance counters are coupled to each processor. The performance counters store performance data generated by each processor while executing the instructions. An interrupt handler executes on each processors, the interrupt handler samples the performance data of the processor in response to interrupts. A first memory includes a hash table associated with each interrupt handler, the hash table stores the performance data sampled by the interrupt handler executing on the processor. A second memory includes an overflow buffer, the overflow buffer stores the performance data while portions of the hash tables are active or full. A third memory includes a user buffer, and means are provided for periodically flushing the performance data from the hash tables and the overflow to the user buffer.

18 Claims, 16 Drawing Sheets

| | Shared Variable | Meaning |
|---|---|---|
| 610 | int ncpus | Number of cpus on the machine |
| 620 | hash_table hash[ncpus] | Hash table for each cpu |
| 630 | int flush_chunk[ncpus] | Chunk flushed on each cpu |
| 640 | int active_chunk[ncpus] | Chunk accessed by cpu handler |

Figure 6

```
701.    int I = ... current cpu...;
702.    int c = ...chunk to be used ...'
703.    if (flush_chunk[i] == c) {
704.            ... desired chunk is being flushed;
                determined next free slot in overflow buffer'
                write sample directly into that slot, and return;
                if no free slots, discard sample and return ...
705.    }
706.    if ... hash hit ... then
707.            .... increment count for entry in hash table ...
708.    else
709.            active_chunk[i] = c;
710.            memory_barrier ();
711.            slot_index s = ... next free slot in overflow buffer ...
712.            if ... no free slot available ... then return;
713.            if (flush_chunk[i] == c) then
714.                    memory_barrier ();
715.                    active_chunk[i]i = -1;
716.                    ... write sample to slot s in overflow buffer ...
717.            else
718.                    memory_barrier ();
719.                            ... write old entry into slot s in overflow buffer ...
720.                            ... write new entry into hash table ...
721.                    memory_barrier ();
722.                    active_chunk[i]i = -1;
```

FIG. 7

801. for (i = 0; i < ncpus; i++) {

802.     for (c = 0; c < table_size; c+=chunk_size) {

803.         flush_chunk[i] = c;

804.         memory_barrier();

805.         while active_chunk[i] = c do {}

806.         memory_barrier();

807         ... copy and zero chunk c on cpu I ...

808.         memory_barrier();

809.         flush_chunk[i] = -1;

| Buffer Global Variables | | Meaning |
|---|---|---|
| 910 | lock overflow_lock | |
| 920 | buffer overflow[2] | a pair of overflow buffers |
| 930 | int index[2] = 0 | index of next slot to write into the given buffer |
| 940 | int completed[2] = 0 | number of completed writes to the given buffer |
| 950 | int current_overflow = 0 | current buffer to write new entries |
| 960 | int full_overflow = -1; | full buffer (or none if -1) |

Figure 9 acquire_lock(overflow_lock);

co = current_overflow;

i = index[co];

index[co] = i + 1;

if (i == ... buffer size ... - 1) {

/* buffer full; try to make other buffer current */ if full_overflow = -1 {

/* other buffer is empty; make it current */ full_overflow = co;

current_overflow = ! co;

... notify daemon to flush the now-full buffer ...

} else { /* both buffers are full; drop this sample */ index[co] = I;

... return indication - no free slots available ...

}

} release_lock(overflow_lock);

... return the slot_index (co, I) ...

Figure 10 overflow[co][j] = ... entry to be written ...;

acquire_lock(overflow_lock);

completed[co] = completed[co] + 1;

release_lock(overflow_lock);

Figure 11

```
acquire_lock(overflow_lock);

if (full_overflow == -1) { full_overflow = current_overflow;

current_overflow = ! current_overflow

} release_lock(overflow_lock);

while (completed[full_overflow] < index[full_overflow]) {} memory_barrier();

... copy overflow[full_overflow] to the user buffer ...

acquire_lock(overflow_lock);

completed[full_overflow] = 0;

index[full_overflow] = 0;

full_overflow = -1;

release_lock(overflow_lock);
```

Figure 12

```
1301.   interrupt(cpu, sample) {

1302.       if (bypass_hash[cpu]) {

1303.           write_to_overflow(cpu, sample)

1304.       } else {

1305.           if (... hash hit ...) {

1306.               increment count for entry in hash table

1307.           } else {

1308.               old := pick old entry to evict from hash table 1309.               store new sample in hash table 1310.               write_to_overflow(cpu, old)

```
1401.       flush_hash() {

1402.           for each cpu {

1403.               if (cpu == current cpu) {

1404.                   bypass_hash[cpu] := true 1405.                   copy hash_tables[cpu] to user space 1406.                   bypass_hash[cpu] := false 1407.               } else {

1408.                   interprocessor_interrupt(cpu) {
                    bypass_hash[cpu] := true }

1409.                   copy hash_tables[cpu] to user space 1410.                   interprocessor_interrupt(cpu) {
                    bypass_hash[cpu] := false }

| | |
|---|---|
| 1501. | write_to_overflow(cpu, sample) { |
| 1502. |    if (active buffer is not full) { |
| 1503. |       append sample to active buffer, increment index |
| 1504. |    } else { |
| 1505. |       if (allow_flip[cpu]) { |
| 1506. |          active[cpu] := 1 - active[cpu] |
| 1507. |          wakeup user daemon to read full buffer |
| 1508. |          drop all samples from new active buffer |
| 1509. |          append sample to active buffer, inc index |
| 1510. |       } else { |
| 1511. |          drop sample and return |
| 1512. |       } |
| 1513. |    } |
| 1514. | } |

Figure 15

```
flush_overflow(cpu) { if (cpu == current_cpu) { allow_flip[cpu] := false copy inactive buffer for cpu to user space allow_flip[cpu] := true } else { interprocessor_interrupt(cpu) { allow_flip[cpu] := false } copy inactive buffer for cpu to user space interprocessor_interrupt(cpu) { allow_flip[cpu] := true }

HIGH FREQUENCY SAMPLING OF PROCESSOR PERFORMANCE COUNTERS

FIELD OF THE INVENTION

The present invention relates generally to computer systems, and more particularly to collecting performance data in computer systems.

BACKGROUND OF THE INVENTION

Collecting performance data in an operating computer system is a frequent and extremely important task performed by hardware and software engineers. Hardware engineers need performance data to determine how new computer hardware operates with existing operating systems and application programs.

Specific designs of hardware structures, such as processor, memory and cache, can have drastically different, and sometimes unpredictable utilizations for the same set of programs. It is important that flaws in the hardware be identified so that they can be corrected in future designs. Performance data can identify how efficiently software uses hardware, and can be helpful in designing improved systems.

Software engineers need to identify critical portions of programs. For example, compiler writers would like to find out how the compiler schedules instructions for execution, or how well execution of conditional branches are predicted to provide input for software optimization. Similarly, it is important to understand the performance of the operating system kernel, device driver, and application software programs.

It is a problem to accurately monitor the performance of hardware and software systems without disturbing the operating environment of the computer system. Particularly, if the performance data is collected over extended periods of time, such as many days, or weeks. In many cases, performance monitoring systems are hand crafted. Costly hardware and software modifications may need to be implemented to ensure that operations of the system are not affected by the monitoring systems.

One way that the performance of a computer system can be monitored is by using performance counters. Performance counters "count" occurrences of significant events in the system. Significant events can include, for example, cache misses, instructions executed, I/O data transfer requests, and so forth. By periodically sampling the performance counters, the performance of the system can be deduced.

It is desired that the performance of a computer system can be monitored without modifying the software. It is also desired that the sampling rate can be fixed or variable, and that the rate can be very high. Furthermore, during high frequency sampling, it is desired to keep the overhead of the sampling to a minimum, so that the performance data accurately reflect the operation of the system. Keeping the overhead low is particularly difficult in a multi-processor system where data accesses need to be synchronized, and the sampling rate can be very high, for example 50 to 100 thousand samples per second.

SUMMARY OF THE INVENTION

The invention provides an apparatus for collecting performance data in a computer system. The computer system includes a plurality of processors for concurrently executing instructions of a program The apparatus comprises a plurality of sets of performance counters. There is one set of performance counters coupled to each processor. The performance counters are for storing performance data generated by each processor while executing the instructions.

An interrupt handler executes on each processors. The interrupt handler is for sampling the performance data of the processor in response to interrupts. A first memory includes a hash table associated with each interrupt handler. The hash table stores the performance data sampled by the interrupt handler executing on the processor. A second memory includes an overflow buffer, the overflow buffer is for storing the performance data while portions of the hash tables are inactive, and while the portions are full. A third memory includes a user buffer. In addition, means are provided for periodically flushing the performance data from the hash tables and the overflow buffer to the user buffer.

In one aspect of the invention, the hash table of the first memory is organized as a multi-way set-associative cache. In addition, the multi-way set-associative cache further includes a plurality of chunks, where each chunk is a unit of data transfer between the first and third memories. Each chunk further includes a plurality of cache lines, and associated with each chunk is an active_chunk flag and a flush_chunk flag for respectively indicating if the corresponding chunk is inactive and full. The lines of each chunk are further partitioned into a plurality of entries, and each entry includes a plurality of fields for storing the performance data. The fields of the performance data include a processor identification, a program counter, a processor event identification; and a processor event counter field.

In another aspect of the invention, means are provided for generating a hash index from the processor identification, program counter, and processor event identification. The hash index is used to probe the lines of the hash table associated with a particular processor to generate a hit or a miss signal.

In response to the miss signal, performance data stored at a current entry indexed by a current hash index is moved from the hash table to the overflow buffer. The current entry is overwritten with the performance data sampled by the interrupt handler. In the case of the hit signal, the processor event counter stored at the current entry indexed by the current hash index is incremented. The performance data is stored in the entries in a compressed form.

In another aspect of the invention, the overflow buffer of the second memory includes a first and second buffer organized as a double buffer. Each buffer includes a plurality of slots for storing the performance data of the entries of the hash tables.

BRIEF DESCRIPTION OF THE DRAWINGS

FIG. 6 shows variables shared by an interrupt handler and a hash table flushing routine;

FIG. 7 shows pseudo-code for an interrupt handler routine;

FIG. 8 shows pseudo-code for a flushing a hash table;

FIG. 9 shows shared synchronization variables;

FIG. 10 shows pseudo-code for acquiring a free slot in an overflow buffer;

FIG. 11 shows pseudo-code for writing an entry to a free slot of the overflow buffer;

FIG. 12 shows pseudo-code for flushing the overflow buffer;

FIG. 13 shows pseudo-code for handling overflow buffer events during sample event interrupts;

FIG. 14 is pseudo-code for flushing a hash table; and

FIG. 15 is pseudo-code for a routine to write entries to the overflow buffer;

FIG. 16 is pseudo-code for a routine to flush the overflow buffer to a user buffer;

DETAILED DESCRIPTION OF PREFERRED EMBODIMENTS

System Overview

Figure 1:
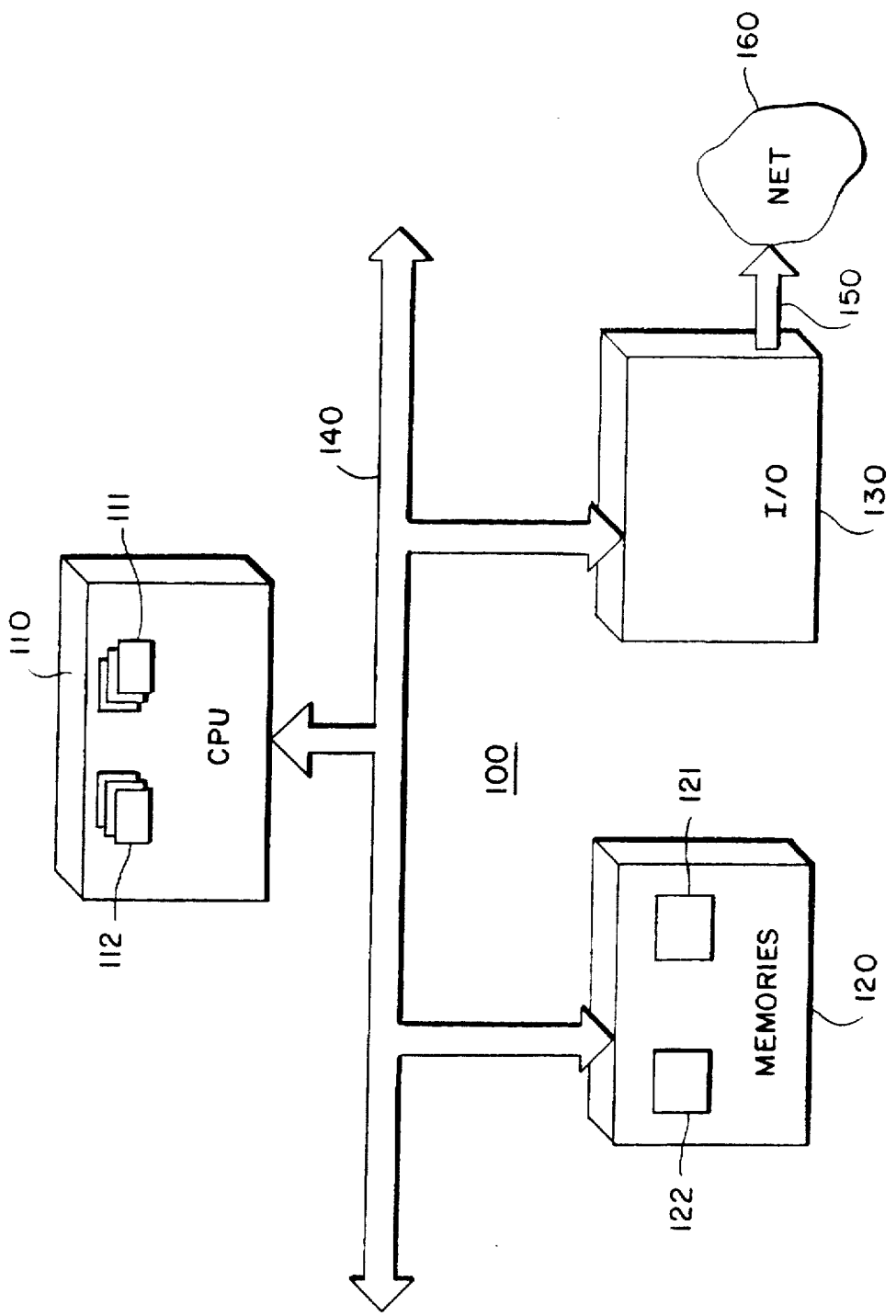
FIG. 1 is a block diagram of a computer system whose performance data can be collected by a performance monitoring sub-system according to the invention.

As shown in FIG. 1, a computer system 100 includes a processor 110, a memory sub-system (memories) 120, input/output interfaces (I/O) 130 connected to each other by a bus 140. The system 100 can be an embedded system, a PC, a workstation, a mainframe, or a member of a cluster of systems linked by a network.

The processor 110 can be configured as one or more individual processor chips 111 having either CISC or RISC architectures. Associated with each processor 111 is a set of performance counters 112. Each set of performance counters 112 can be implemented as a plurality of registers. The registers can count the occurrences of significant events in the system which are indicative of the system's performance.

The memories 120 can include separate static, dynamic, random, sequential, volatile, and persistent storage elements, or combinations thereof. Some of the memories can be arranged hierarchically. The storage elements can be registers, caches, DRAM, disk, tape, and the like. The memories 120 store software programs 121 in the form of machine executable instructions, and data 122 accessed by the instructions. The software programs can include operating system, device driver, and application programs.

The I/O 130 can include interfaces to input and output devices such as printers, terminals, and keyboards. The I/O 130 can also connect via lines 150 to a network (NET) 160 for communicating data with other computer systems. The bus 140 typically is implemented as a plurality of lines for carrying address, data, control, and timing signals between the various components.

Operational Overview

During operation of the system 100, the instructions of the programs 121 are executed by the one or more processors 11. The instructions, generally, either control the execution flow of the programs, or access (load, store, read and write) the data 122. It is desired to collect performance data of the system 100 without significantly disturbing the normal operating environment. Analysis of the performance data can be used to optimize the design of the hardware and software components of the system 100. The performance data can also be used to determine operating problems such as pipeline stalls.

Data Collection Sub-System

Figure 2:
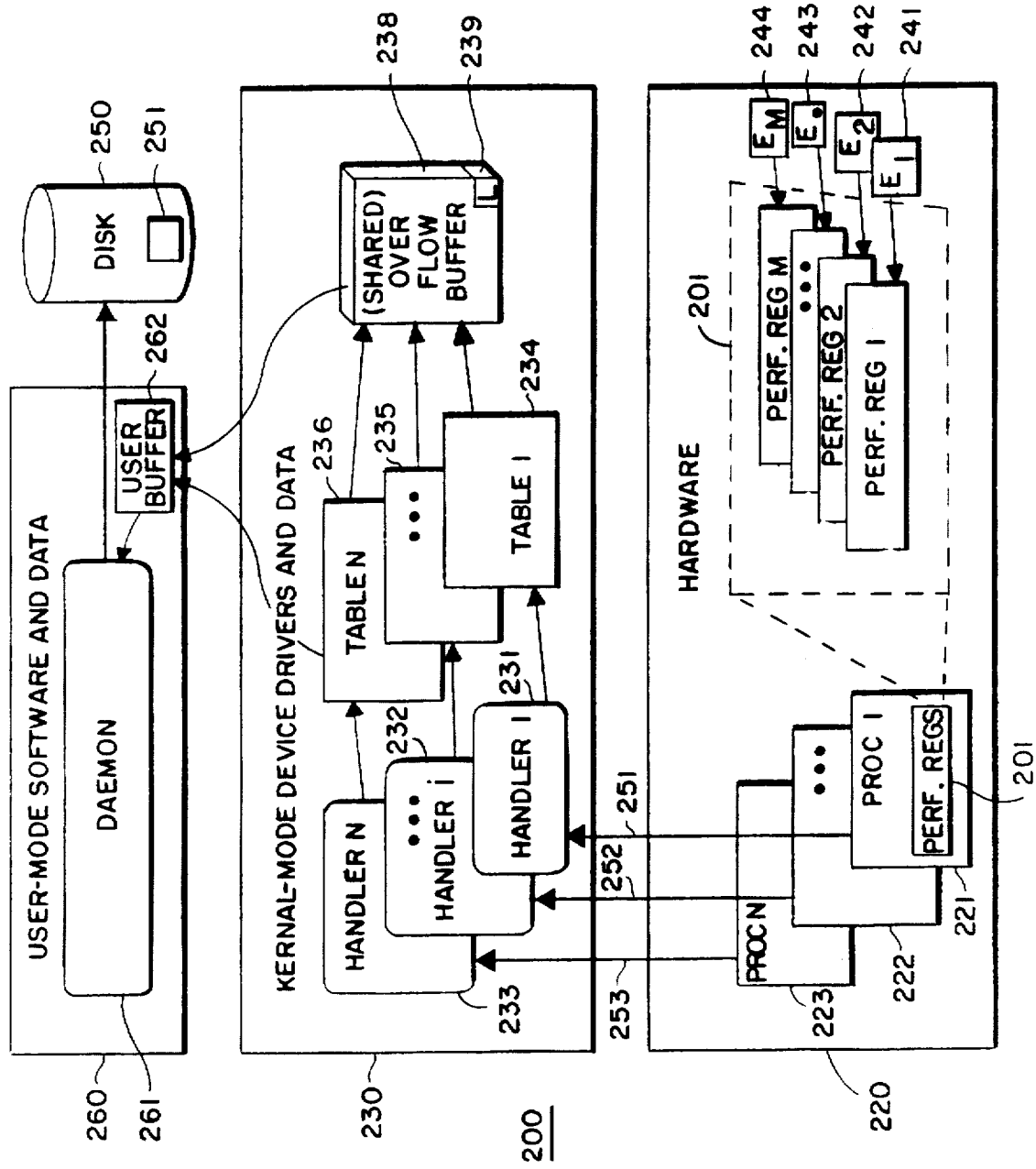
FIG. 2 is a block diagram of the data collection sub-system.

In one embodiment as shown in FIG. 2, a performance data collection sub-system 200 includes various hardware devices 220, kernel-mode programs and data structures 230, and user-mode program and data structures 260. The programs and data 230 and 260 can be stored in the memories 120 of FIG. 1.

The hardware 220 can include a plurality of individual processors 221–223. Associated with each processor is a set of performance counters or registers 201. The sets of registers 201 can be co-resident with the associated processor on the same semiconductor die. Each set 201 can include a plurality of registers.

Each of the registers can include a multiple number of bits to store a count of performance events. The total number of occurrences of a specific event that can be accumulated in any one counter depends on the size, or number of bits of the registers.

Depending on a specific implementation, the sets of registers 201 can be enabled, disabled, paused, resumed, reset (cleared), read, and written. Typically the registers cause interrupts 251–253 on overflow (a carry out in some specified bit position). In response to the interrupts, the registers 201 can be sampled (read). In some implementations, an interrupt may be generated on the setting of a specific bit of one of the registers to count frequencies corresponding to integer powers of two.

During operation of the hardware 220, signals or "events," e.g., ($E_1, \ldots, E_M$) 241–244 representing various operating characteristics of the system cause the corresponding register to be incremented. The exact events which are signaled are usually system specific. Typical events which can increment the registers can include, for example, cache misses, branch mispredictions, pipeline stalls, instructions issued, arithmetic operations, processor cycles, replay traps, translation buffer misses, I/O requests, processes active, and so forth. One or more specific number of events can be selected for sampling at any one time.

The kernel-mode components 230 of the sub-system 200 includes device drivers or interrupt handlers (programs) 231–232, and tables 234–236. There is one handler and associated table for each of the processors. As an advantage, having one hash table for each processor eliminates the need to synchronize most processing activities between the various processes. In addition, in one embodiment, there is an overflow buffer 238 which is shared by all the handlers 231–233. Access to the buffer 238 is controlled by a lock (L) 239. In an alternative embodiment, each handler can be associated with a private buffer to further reduce the number of events that need to synchronized.

During operation of the kernel-mode components 230, an interrupt activates a corresponding handler. The handlers 231–233 can operate as multiple concurrently executing processes or threads. The handlers read the performance data from the registers and store the data in one of the associated tables 234–236 as described in greater detail below. If any of the tables become full or are inaccessible, the overflow data can be stored in the overflow buffer. In order to write to the buffer 238, a process must first acquire the lock 239 to ensure data consistency.

The user-mode components 260 include a daemon process 261, one or more user buffers 262, and processed performance data 251. The data 251 can be stored on a disk 250 or other forms of non-volatile storage which can be part of the memories 120 of FIG. 1.

During operation, the daemon 261 can periodically flush (empty) the hash tables and overflow buffer into the user buffer 262. In addition, the daemon 260 can further process the accumulated performance data to produce, for example, execution profiles, histograms, and other statistical data that are useful for analyzing the performance of the system 100.

Hash Table

Figure 3:
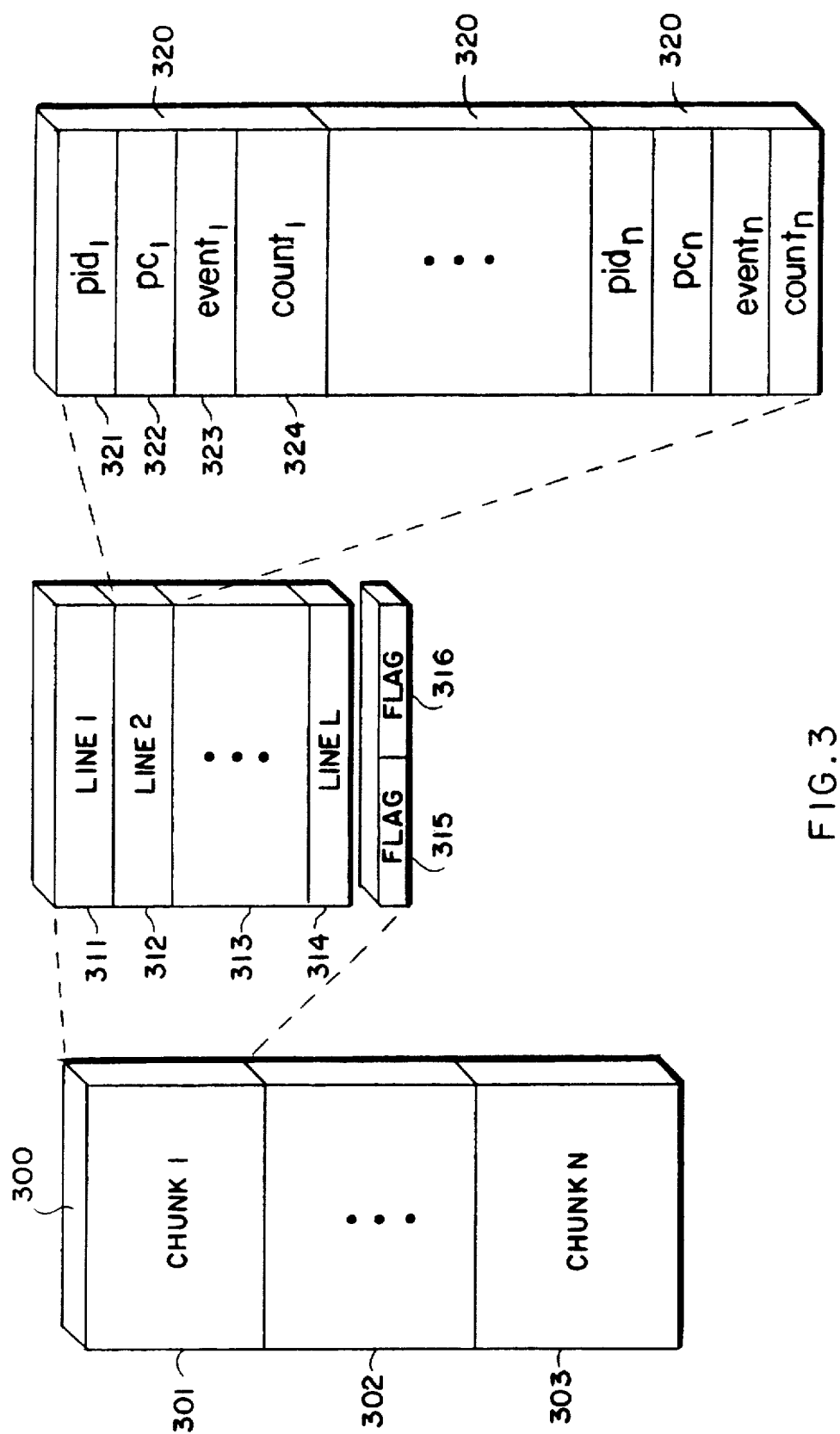
FIG. 3 is a block diagram of a hash table for storing collected performance data.

As shown in FIG. 3 for a preferred embodiment, each of the tables 234–236 is constructed as a hash table 300. A hash table is a data structure which is accessed by a hash index. Typically, a hash index is some deterministically computed address which tends to randomly distribute data over a range of addresses.

Hashing functions are well known. In this embodiment for collecting performance data, hash tables are used to reduce the memory bandwidth required to transfer data between kernel and user processes. More specifically as described below, each hash table can be implemented as a multi-way set-associative cache to reduce the bandwidth for the memory sub-system. The preferred embodiment of the invention uses four-way associativity in the hash table 300.

The hash table 300 is partitioned into a plurality of chunks 301–303. The chunk is the unit of data transfer between the kernel and user mode components. Each chunk of the hash table 300 is further partitioned into a plurality of cache lines 311–314. A cache line typically is a coherent unit of data transfer which is efficiently handled by the memory transfer logic and caches of the system.

The (four-way) associativity of the hash table 300 is carefully selected to match the size of hardware cache lines 311–314, for example, each cache line includes 64 bytes. Also, associated with each of the chunks 301–303 are active_chunk and flush_chunk flags 315 and 316. The flags can be implemented as bits in a memory byte. The active_chunk flag 315 can be set when one of the handlers is modifying (updating) data stored in one of the chunks of the hash table. When the flag is clear, the corresponding chunk is inactive, or not being written to. The flush_chunk flag 316 can be set when data are copied from the hash table into a user buffer. The unsynchronized handling of the tables and buffer is described in greater detail below.

Each cache line includes a plurality of set-associative entries 320. Each entry 320 includes a plurality of fields 321–324. For example, the fields 321–324 respectively store a process identification (pid), a program counter (pc) and event identification (event) and a counter value (count). The data stored in the entries 320 of the lines 311–314 is highly compressed to reduce the number of cache misses. By matching the associativity to the size of the cache lines, a maximum number of entries can be probed in case of a single cache miss. Storing the sample data as compressed cache lines reduces the bandwidth and stress on the memory-subsystem 120.

Interrupt Handler Process

Figure 4:
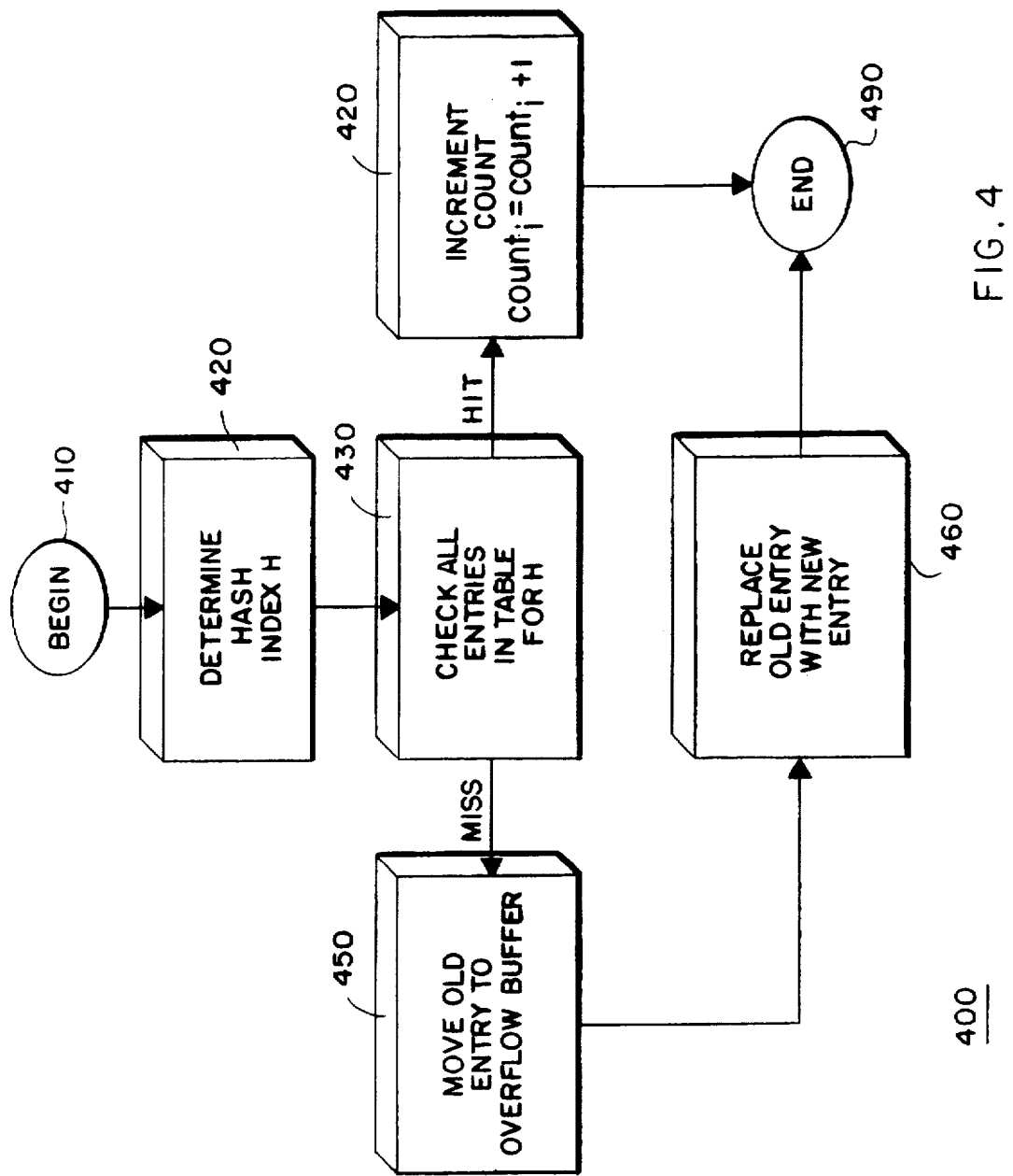
FIG. 4 is flow diagram for updating the hash table of FIG. 3.

FIG. 4 shows a process 400 of the handlers of FIG. 2. The process 400 is for updating the entries 320 of the lines of the hash table 300 of FIG. 3. The process begins, typically in response to an interrupt, at step 410. In step 420, determine a hash index $H_i$. The index can be determined by some hash function $f_{hash}$ which combines the bits, for example an exclusive OR of this instance of $pid_i$, $pc_i$, and $event_i$, for example, $H_i = f_{hash}(pid_i, pc_i, event_i)$.

In step 430, check all entries for index $H_i$ in the table 300 to determine if they match on $pid_i$, $pc_i$, and $event_i$. In case of a hit, increment the count field 324, i.e., $count_i = count_i + 1$ in step 440.

In case of a miss, that is, there is no hit at any entry for the index and the table is full, $H_i$, move an entry at index $H_i$ to the overflow buffer 238 of FIG. 4 in step 450. Store the new entry at the index $H_i$ in the hash table, step 460, and set the count to 1. In either case of a hit or a miss, the process completes in step 490.

A particular interrupt handler must access several pieces of global data. The global data include the pointer to the hash table for the processor on which the handler is running, the line of the hash table indexed by the value of the hash function for the new entry, the pointers to the overflow buffers, several global variables used to control the state of the data structures (e.g., the next index for insertion into the active overflow buffer, and a counter indicating which entry in a given line should be evicted on the next miss in the hash table), and miscellaneous other global variables.

All of this global data is carefully laid out to match the hardware structure used to store the data. For example, on a processor with 64-byte cache lines, the data are packed into a single 64-byte structure. This ensures that at most a single cache miss will be incurred to access any of this data. Because a cache miss can incur on the order of one hundred cycles or more, and because the interrupt handler should not consume no more than a few hundred cycles overall to complete, minimizing the number of cache misses is vital to minimize the impact of the performance data collection.

In addition, on a multiprocessor writing to a cache line that contains data that are shared among multiple processors is expensive. Global data are carefully replicated on the different processors so that each processor has its own copy, avoiding the need to write to shared cache lines.

In an alternative embodiment, the amount of time for handling interrupts can be reduced by using several different handlers, each handler optimized for particular situations. For example, in one embodiment with multiple overflow buffers described below, the interrupt handler starts by checking whether to bypass the hash table. Most of the time, this check will be false, and the table is not bypassed.

However, a version of the interrupt handler can be produced that does not check the flag to see if it should bypass the hash table. Instead, the handler assumes that it should access the hash table. Whenever the flag is changed to indicate whether or not the hash table should be bypassed, a system-level interrupt vector can be changed to point to the appropriate interrupt handler. In the common case when the hash table should not be bypassed, this ensures that no check is needed, and thus several processor cycles are saved. A careful analysis of all the different flags and their settings in the common cases, and the use of specialized versions of the interrupt handler for the common cases, can result in much faster performance.

The synchronization with other processes while manipulating performance data stored in the hash table is described in more detail below.

Synchronization

Synchronization of access to the hash table and the overflow buffer is managed as follows. First, there are separate hash tables 234–236 for each processor; hence, the interrupt handlers 231–233 running on the different processors do not need to synchronize with each other while manipulating the hash tables. However, the handlers share the overflow buffer 238, and hence access to the overflow buffer needs to be synchronized as described below.

In addition, procedures are provided by the kernel-mode device drivers to permit the user-level daemon 261 to retrieve all sample data from the tables and overflow buffer of the kernel into the user buffer 262 to ensure that the daemon 261 has current information. Separate routines, called "flush_hash" and "flush_overflow," are provided to retrieve data from the hash tables and the overflow buffers respectively. These routines need to synchronize with the handlers 231–233 as described below.

Hash Table Synchronization

Figure 5:
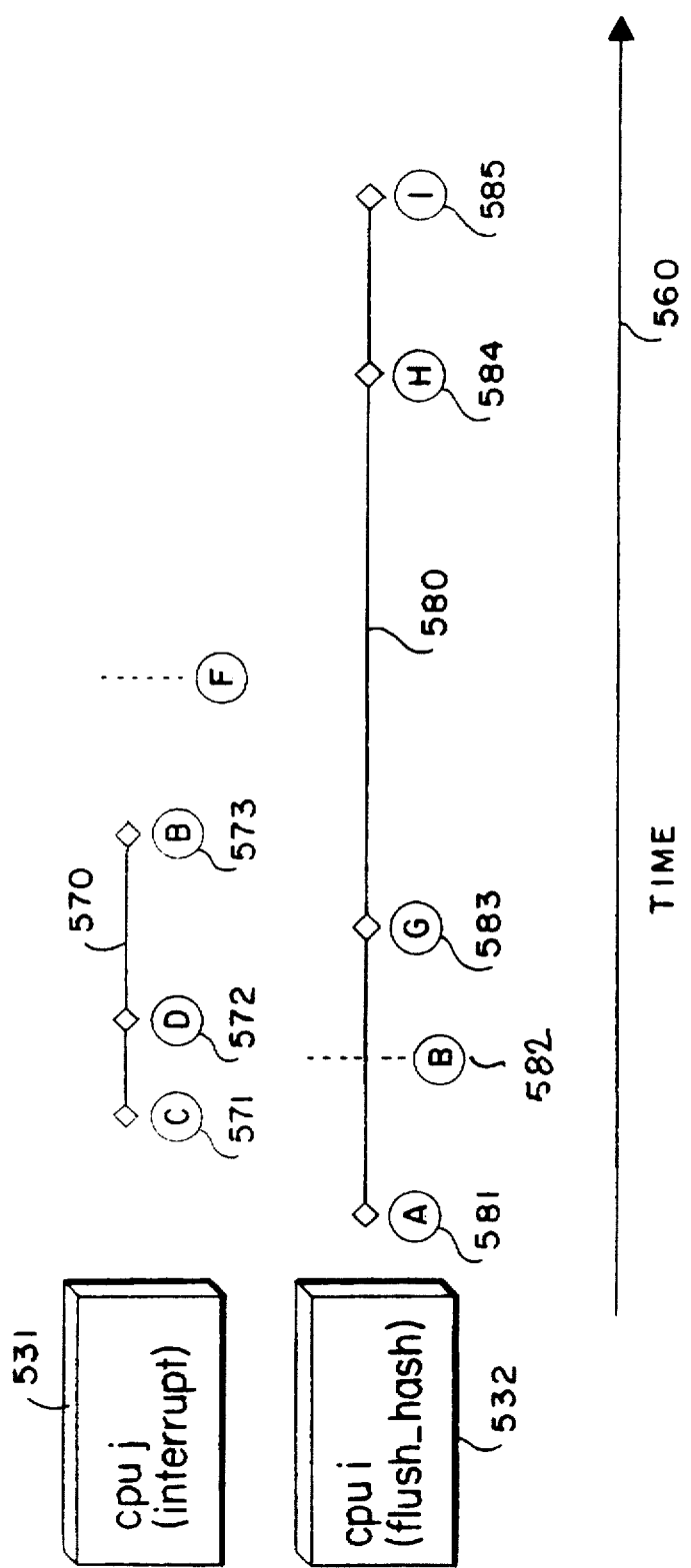
FIG. 5 is timing diagram of unsynchronized updating of the hash table.

There are two activities that need to synchronize access to a hash table on a given processor: the interrupt handler for that processor, and the flush_hash routine. The timing of possible events that need to be synchronized is shown in FIG. 5. The global variables shared by the interrupt handler and the flush_hash routine are shown in FIG. 6. The pseudo-code for the interrupt handler is shown in FIG. 7, and pseudo-code for the flush_hash routine is given in FIG. 8.

While a hash table for a particular processor is being flushed, the interrupt handler cannot be allowed to access the table. Therefore during this time, the interrupt handler stores sample data directly into the overflow buffer 238. To minimize the number of samples that are written directly to the overflow buffer 238, the hash table is flushed a chunk at the time. A sample whose hash index falls into a chunk being flushed is written directly to the overflow buffer. However, a sample whose chunk is not being flushed is written into the hash table as described above.

The active_chunk and the flush_chunk flags 315–316 respectively indicate which chunks are in use by the interrupt handler and the flush_hash routine. Each flag records the name of a chunk; a chunk is named by the index of its first entry. The value −1 is used in the active_chunk and flush_chunk flags to indicate that no chunk is in use, e.g., the chunk is inactive.

Note, the procedures for determining a next free slot to store sample data in the overflow buffer, and for writing an entry to the free slot of the overflow buffer are described below as part of the description of synchronizing access to the overflow buffer 238. There, the data type "slot_index" is also described.

The synchronization in the flush_hash routine is subtle, in part, because the routine is intended to be used on a system with multiple high-speed processors, and where the memory model is not sequentially consistent, see, L. Lamport, "*How to make a multiprocessor computer that correctly executes multiprocess programs*", IEEE Transactions on Computers C-28, (September 1979) pp 690–691.

A memory model is sequentially inconsistent when the ordering of operations is only guaranteed under certain conditions. Processors can issue and execute instructions in a first order, however, the memory sub-system may complete accesses in a second order (the "memory order"). Furthermore, the memory order is transitive: if A occurs before B and B occurs before C, then A occurs before C. The order in which operations actually happen is determined by the memory order according to the following constraints.

1. Memory access operations on a single memory location by a single processor occur in the order in which access instructions are issued by that processor.
2. Memory access operations on different memory locations by a single processor can occur in any order, unless the operations are separated by a "memory barrier" (MB) instruction. In this case, all operations before the memory barrier instruction occur before all operations after the memory barrier instruction.
3. If two processors access the same memory location by one processor reading, and the other processor writing, and furthermore, the reading processor notices the value being written, then the read operation occurs after the write operation.

Note, the memory barrier instruction takes a relatively long time to execute. Therefore, it is desirable to minimize the use of the MB instruction on frequently traversed execution paths.

Depending on a particular path taken in the interrupt handler shown in FIG. 7, there are three cases to consider. The handler can execute the code beginning on line 704, 707, or on lines 709–722. Each of these cases is discussed in turn below.

First, if the handler executes the code beginning on line 704, the handler does not need to access the hash table at all.

The sample is written directly to the overflow buffer 238, which is synchronized as discussed below to avoid lost or double-counted samples. It is possible in this case, that the handler decides on line 703 to execute line 704, even though the variable flush_chunk|i| has been set by the flush_hash routine (running on a different processor) to a value other than c.

This is because the memory sub-system 120 of FIG. 1 does not guarantee that the new value of the variable flush_chunk|i| is visible right away on all other processors. This does not cause incorrect behavior; it simply means that some samples are written to the overflow buffer when they could just as well have been stored in the hash table. Thus, performance is degraded slightly, but correctness of the data is not affected.

Second, if the handler executes the code on line 707, no expensive synchronization operations are performed. When the handler is on line 707, it has found a matching entry in the hash table, which means it simply needs to increment the count for that entry. Note, however, that in this case it is possible, though extremely unlikely, for a single sample to be lost.

FIG. 5 shows possible timings for hash table accesses. In FIG. 5, time line 560 shows overall time increasing from left-to-right, line 570 indicates the timing of events of an interrupt handler 531 of one processor (cpu j), and time line 580 shows the timing of events of the flush_hash routine of another processor (cpu i) 532.

The interrupt handler (cpu j) 531 executes several actions: the handler reads the flush_chunk flag (event C 571); it finds a hit in the hash table; it reads the count for the matching entry in the hash table (event D 572); and it writes the incremented count back into the hash table (event E 573).

If the flush_hash routine is not concurrently running to flush the overflow buffer 238, then the incremented count is written back correctly. However, it is possible, even though the interrupt handler has checked the active_chunk flag 315, and determined that it was not set for the chunk it needed, that the flush_hash routine is in fact concurrently flushing that chunk. In this rare case, a careful analysis of the timing, as discussed below, shows that it is possible for a single sample to be lost, however, samples cannot be double-counted.

In FIG. 5, the following events take place with respect to the flush_hash routine. The flush_chunk flag 316 is set for the chunk to be flushed next (event A 581). Then, the routine copies the hash-table entry being used by the interrupt handler to the user buffer (event G 583). Next, the routine zeroes the entry in the hash table (event H 584), and indicates completion by clearing the flush_chunk flag 316 (event I 585).

The times for two other events are depicted in the FIG. 5: the time by which the updated value of the flush_hunk flag is guaranteed to have propagated to all other processors (event B 582), and the time by which the incremented count written back into the hash table by the interrupt handler is guaranteed to have propagated everywhere (event F 574). Note that these times may depend on a specific processor implementation, and may not be predetermined by the architectural specification.

If event E 573 occurs (in memory order) before event G 583, then the incremented count is copied to the user buffer at the time of event G 583, and the count is reset to zero at the time of event H 584. In this case, the sample is counted exactly once. This is rare.

If event E 573 occurs after event H 584, the incremented count will be written back into the hash table after the count in the entry has been set to zero. This would lead to the samples represented by original count in this entry to be counted twice, once by being copied to the user buffer at the time of event G, and again the next time this entry is evicted or flushed from the hash table. This is not acceptable, since a single hash-table entry can have a large count representing many samples.

Double-counting cannot happen as long as event E 573 occurs before event H 584. This is guaranteed by the constraints set out below on the following variables.

Let "max_prop" be the maximum time it can take for a stored value to propagate to all processors. Let "max_intr" be the maximum time for the interrupt routine when it executes line 707 of FIG. 7. Let "min_flush" be the minimum time from event A (581) to event H (584) for the same entry (i.e. the minimum time from when the flush_chunk flag 316 is set until the time flag 316 is cleared by the flush_hash routine).

The following constraint ensures that event E (573) occurs before event H:

$$(\text{max\_intr} + (2 * \text{max\_prop})) < \text{min\_flush}.$$

The timing in a specific processor implementation can be measured to determine max_prop and max_intr. Then the chunk size can be chosen to be big enough to ensure that min_flush is large enough.

Third, if the handler executes lines 709–722, it must move an entry from the hash table to the overflow buffer, and then write a new entry with a count of one into the hash table.

To avoid loss or double-counting of the entry being moved from the hash table to the overflow buffer, careful synchronization with the two flags (active_chunk[i] and flush_chunk [i]) and up to three memory barrier operations are used. While this synchronization is relatively expensive, this occurs only when there is a miss in the hash table, which is relatively rare.

The key property of this code is that lines 719 and 720 are mutually exclusive with line 707. This algorithm is a variant of standard mutual exclusion techniques adapted for use with memory barrier instructions. The technique forces the ordering of operations and ensures that the interrupt handler does not wait for a lock.

Instead of waiting until the flush_hash routine is done with the desired chunk, the interrupt handler simply bypasses the hash table on lines 714–716 of the pseudo-code when the desired chunk is not available. Also, in the very unlikely event that the overflow buffer is full, the interrupt handler simply returns, discarding the sample. As an advantage, the result is that in this case, when the handler executes lines 709–722 of the pseudo-code, no samples are lost or double-counted.

The net effect of this approach is that in the common case of a hit in the hash table, the handler executes no expensive synchronization operations, but in very rare cases may lose a sample.

Note that code lines 710, 714, and 718 can be optimized; getting a slot in the overflow buffer on line 711 requires acquiring and releasing a lock. Acquiring the lock involves a memory barrier, as does releasing it, so the memory barrier at line 710 can be eliminated. Also, if the lock release is moved to after the conditional test on line 713 (i.e. the lock release is performed on lines 714 and 718), the memory barriers on lines 714 and 718 can be removed as well.

Overflow Buffer Synchronization

In a preferred implementation, the overflow buffer 238 is actually split into two portions to permit one piece to be flushed while another piece is being accessed by a handler. This type of technique is sometimes called "double buffering." In addition, the lock 239 on the overflow buffer 238 is held only while pointers into the buffer are manipulated, not while entries are being written into it. This improves efficiency by allowing handlers to write entries into the same overflow buffer in parallel.

For clarity, the description of the overflow buffer 238 above was simplified as if it were a single buffer, and a slot is identified by a value of type slot_index. Here, the details of how the buffer and a slot_index are represented are provided.

There are two buffers. An index (slot_index) into the buffers is composed of a buffer id (either 0 or 1), and the index of a slot in that buffer. The global variables shared by the handlers and flush_overflow are shown in FIG. 9; the procedures used by the handlers to determine the next free slot and to write an entry into the overflow buffer are shown in FIGS. 10 and 11; and the flush_overflow routine is shown in FIG. 12.

The flush_overflow routine flushes a single overflow buffer. If a full buffer is waiting to be read, the fullone is flushed; otherwise, the current partially full buffer is flushed while overflows go to the other buffer.

A single lock (overflow_lock) 239 is used to synchronize access to the variables of FIG. 9 and to manage the buffer (index, completed, current_overflow, and full_overflow). All updates to these variable are performed while holding the overflow_lock. For buffer i, index[i] is the index of the next slot to be written into.

Entries are written into the overflow buffer without holding the lock; instead, a slot is reserved in buffer i by incrementing index[i]. Only the processor that reserved that slot is allowed to write to it. When the processor is done writing to the slot, it increments completed[i] as described with respect to FIG. 11. Thus, slots may be written in any order (although they are reserved in a specific order).

The while loop in the flush_overflow routine waits until completed[i] is equal to index[i]. This means that the writes to all slots that were reserved have completed. Note that index[full_overflow] cannot change while the flush_overflow routine is in the while loop, since slots are not reserved for a full overflow buffer. Also note that completed [full_overflow] is incremented monotonically; since read operations are atomic, it is okay to read completed[full_overflow] without holding the lock, since once a value equal to index[full_overflow] is seen, all writes to reserved slots must have completed.

The memory barrier after the while loop on line 805 of FIG. 8 is needed to make sure that the memory operations involved in copying the full overflow buffer to the user buffer occur after the test that compares completed[full_overflow] to index[full_overflow], in other words, after the writes to the user buffer 262 have actually completed.

In the above technique, all processors evict to a common buffer, which requires a degree of coordination between processors for each eviction. There is actually a pair of overflow buffers, which allows evictions to go to one buffer when the other is full but has yet to be flushed to user buffer. Additional synchronization, based on a careful analysis of the timing of events, ensures proper synchronization of access to the hash tables.

Per-Processor Local Overflow Buffers

In an alternative embodiment, the method above with per-processor hash tables and a single shared overflow buffer can be augmented with an additional small overflow buffer for each processor. In this method, when an interrupt handler wants to write to an overflow buffer, it first checks its local overflow buffer. If that buffer is not full, it simply writes to that buffer. When that buffer is full, it acquires the lock on the shared overflow buffer and copies its entire local overflow buffer to the shared buffer. This reduces the frequency of acquiring locks and also the frequency with which shared cache lines are written, thus improving performance on multiprocessors.

A variation on this method with per-processor local overflow buffers further modifies the method by eliminating the hash tables entirely. This has higher memory traffic than the other methods described above, but still has small overhead for locks and accesses to shared memory on a multiprocessor because writes to the shared overflow buffer are still infrequent.

Multiple Overflow Buffers

In an alternative embodiment, a different synchronization technique can be used to reduce the cost of hash-table synchronization, and overflow-buffer access at the expense of using additional overflow buffers, i.e., two buffers per processor, instead of the single double buffer shared by all processors.

With this technique, each processor "owns" a private hash table (as before) plus a pair of private (double) overflow buffers. In this case, "owning" means that all modifications, with one exception, to the state of active buffers and hash tables is made by that processor, eliminating many of the memory synchronization operations present in the single double buffer technique described above.

There are two major changes to the first technique. First, during flushes of the hash table to the user buffer, performance counter events are appended to the active overflow buffer, bypassing the hash table. This eliminates the synchronization needed to ensure that the hash table is not modified during a flush operation. As in the first technique, the hash table can be flushed in chunks, reducing the frequency with which events must be appended directly to the overflow buffer.

Second, each processor has a private pair of overflow buffers, eliminating the synchronization needed to share a single active overflow buffer across all processors.

The following data state is maintained per processor:

| (A) buffer overflow|ncpus][2] | One pair of overflow buffers per-processor |
| (B) int: index|ncpus] [2] | Index of next slot to write into |
| (C) int: active|ncpus] | Index of active overflow buffer |
| (D) bool: allow__flip|ncpus] | Flag: is it okay to flip buffers? |
| (E) bool: bypass__hash|ncpus] | Flag: bypass the hash table? |

Hash Table Synchronization

There are two activities that access the hash table for a particular processor:

1) The interrupt handler stores new samples into the hash table, and
2) The flush__hash routine copies the hash table to the user buffer.

In the pseudo-code for handling overflow buffer events during interrupts shown in FIG. 13, the "bypass__hash" variable is used to control access to the hash table. Lines 1301–1303 shows that if this variable is set to "true", then the interrupt handler completely skips the hash table and writes the new sample directly into the overflow buffer.

Lines 1305–1310 show the other path through the interrupt handler. If the new sample matches one of the entries in the hash table (lines 1305–1306), then the handler simply increments the count associated with the matching entry. Otherwise (lines 1308–1310), the handler picks one of the existing entries for eviction. This entry is removed from the hash table and written into the overflow buffer. The new sample is written into the empty slot in the hash table.

The pseudo-code for the "flush__hash" routine is shown in FIG. 14. For each process, the routine sets the "bypass__hash|cpu|" flag to true (lines 1404 and 1408), copies the hash table to the user buffer, space, and then resets the "bypass__hash|cpu|" flag to false (lines 1406 and 1410.) For correct synchronization, the "flush__hash" routine is careful to execute the modifications to "bypass__hash|cpu|" on the processor numbered "cpu."

If the processor on which the "flush__hash" routine is running is the same as the processor whose hash table is being copied (lines 1403–1406), then the routine imply sets and clears the "bypass__hash|cpu|" flag via local operations. Otherwise, the "flush__hash" routine uses interprocessor interrupts to cause the modifications to "bypass__hash|cpu|" to be executed on "cpu".

The interrupt handler and the flush__hash routine synchronize correctly because "bypass__hash|cpu|" is read and written only on the processor numbered "cpu". The interprocessor interrupts are set to run at the same interrupt priority level as the interrupt handler for performance counter overflow, ensuring that the handlers execute atomically with respect to each other. Other communication mechanisms, such as sending a message, can also be used instead of interprocessor interrupts, as long as the same level of atomicity is ensured.

Overflow Buffer Synchronization

There are two activities that use the pair of overflow buffers associated with a particular processor. First, the interrupt handler sometimes writes entries to the overflow buffers. Second, the flush__overflow routine periodically copies the contents of the overflow buffers to the user buffer. These two activities are synchronized by marking one of the buffers as the "active" buffer. The interrupt handler is only allowed to write into the "active" buffer, and the flush__overflow routine is only allowed to read from the inactive buffer.

When the active buffer is full, the interrupt handler tries to switch (flip) buffers by marking the old active buffer as inactive, and the old inactive buffer as active. The flag "allow__flip|cpu|" is used to prevent this change from happening while "flush__overflow" is copying the old inactive buffer to the user buffer.

A routine to add an entry to the overflow buffers for a particular processor is shown in FIG. 15. If the active buffer is not full (line 1502), the routine simply appends the sample to the active buffer. If the active buffer is full, then the routine tries to flip (switch) buffers.

The routine first checks to determine whether or not a flip is allowed (line 1505.) If a flip is allowed, then it flips buffers, and prepares the new active buffer for writing by dropping all samples from the new active buffer (line 1508.) After the buffers have been flipped, the routine notifies the user-level daemon to make it read out the full inactive buffer (line 1507.) The new sample is added to the new active buffer. If the flip is not allowed, then the routine drops the new sample and returns (line 1511).

The write__to__overflow routine drops samples in two cases. In the first case, after a flip, any unread samples in the new active buffer are dropped (line 1505.) It is extremely unlikely that any samples will actually be dropped because these samples were available to the flush__overflow routine to read since the time of the last flip, and flips occur very infrequently.

The second case is when the active buffer is full and flips are not allowed. Again this case is extremely unlikely. A flip is disallowed only when the flush_overflow routine is reading out the inactive buffer. The inactive buffer was ready to be read at the time of the last flip, and since flips occur very infrequently in this system, it is unlikely that the flush_overflow routine is still copying out the inactive buffer. In both of the preceding cases, if any samples are dropped, it is an indication that the flush_overflow routine is not being called quickly enough by the user-level daemon in response to an overflow buffer filling up.

The pseudo-code for the "flush_overflow" routine is shown in FIG. 16. This routine copies the inactive buffer to the user buffer for a particular processor. The routine uses the "allow_flip|cpu|" flag to prevent the "write_to_overflow" routine from accessing the inactive buffer while it is being copied to the user buffer. As above in the flush_hash routine, interprocessor interrupts are used to ensure that all accesses to "allow_flip|cpu|" occur on the processor numbered "cpu" and are therefore synchronized correctly.

Information Collected

Depending on the exact implementation of the performance counters, program counter values can be sampled for selected instructions. In addition, for memory access (loads and stores) and jump instructions that have operands specifying general purpose registers, base addresses can also be collected.

The performance monitoring system as described herein can collect performance data for many aspects of the operation of a computer system, including kernel software, input/output device drivers, application programs, shared libraries. This is accomplished by delivering and processing sampling interrupts at a very high rate without unduly disturbing the normal operation of the system It will be apparent to those skilled in the art that various modifications can be made to the present invention without departing from the spirit and scope of the invention as set out in the appended claims.

We claim:

1. An apparatus for collecting performance data in a computer system including a plurality of processors for concurrently executing instructions of a program, comprising:

a plurality of performance counters coupled to each processor, the performance counters for storing performance data generated by each processor while executing the instructions;

an interrupt handler executing on each processors, the interrupt handler for sampling the performance data of the processor in response to interrupts;

a first memory including a hash table associated with each interrupt handler, the hash table for storing the performance data sampled by the interrupt handler executing on the processor;

a second memory including an overflow buffer, the overflow buffer for storing the performance data while portions of the hash tables are being flushed;

a third memory including a user buffer; and means for periodically flushing the performance data from the hash tables and the overflow buffer to the user buffer.

2. The apparatus of claim 1 wherein each hash table of the first memory is organized as a multi-way set-associative cache.

3. The apparatus of claim 2 wherein each multi-way set-associative cache further comprises:

a plurality of chunks, each chunk being a unit of data transfer between the first and third memories.

4. The apparatus of claim 3 wherein each chunk further comprises:

a plurality of lines, and wherein each chunk is associated with an active_chunk flag and a flush_chunk flag for respectively indicating if the corresponding chunk is inactive and being flushed to the user buffer.

5. The apparatus of claim 4 wherein each line further comprises:

a plurality of entries, and each entry includes a plurality of fields for storing the performance data.

6. The apparatus of claim 5 wherein the plurality of fields of each entry further comprise:

a process identification;

a program counter;

a processor event identification; and a processor event counter.

7. The apparatus of claim 6 further comprising:

means for generating a hash index from the processor identification, program counter, and processor event identification, the hash index for probing the lines of the hash table associated with a particular processor to generate a hit or miss signal.

8. The apparatus of claim 7 further comprising:

means for moving performance data stored at a current entry indexed by a current hash index from the hash table to the overflow buffer in response to the miss signal, and overwriting the current entry with the performance data sampled by the interrupt handler; and means for incrementing the processor event counter stored at the current entry indexed by the current hash index in response to the hit signal.

9. The apparatus of claim 6 further comprising:

means for compressing the performance data into the entries of the cache lines.

10. The apparatus of claim 1 wherein the overflow buffer of the second memory includes a first and second buffer organized as a double buffer, and each buffer includes a plurality of slots for storing the performance data of the entries of the hash tables.

11. The apparatus of claim 10 wherein the overflow buffer further comprises:

mean for reading the performance data from the first buffer while writing the performance data to the second buffer.

12. The apparatus of claim 11 wherein the overflow buffer is further partitioned into a plurality of double buffers, one for each processor.

13. The apparatus of claim 1 wherein the first and second memories operate in a processor kernel mode, and the third memory operates in a processor user mode.

14. The method of claim 1 wherein the performance data are collected from unmodified programs.

15. The apparatus of claim 1 wherein the program includes application, operating system, and shared library program components, and further comprising:

collecting the performance data from the application, operating system, and shared library program components concurrently.

16. The apparatus of claim 1 further comprising:

replicating global data used by each interrupt handler on each processor to minimize the amount of data that are shared among the processors.

17. The method of claim 1 further comprising:

collecting the performance data continuously while the computer system is executing production programs.

18. A computerized method for collecting performance data in a computer system including a plurality of processors, the plurality of processors for concurrently executing instructions of a program, comprising:

storing performance data in a plurality of sets of performance counters, there being one set of performance counters coupled to each processor;

sampling the performance data stored in the sets of performance counters in response to interrupts;

storing the sampled performance data in a plurality of hash tables of a first memory, there being one hash table for each processor;

storing the sampled performance data in an overflow buffer of a second memory while portions of the hash tables are inactive, and while the portions are full;

storing the performance data in a user buffer of a third memory;

periodically flushing the sampled performance data from the hash tables and the overflow buffer to a user buffer.

* * * * *